Figure 1:
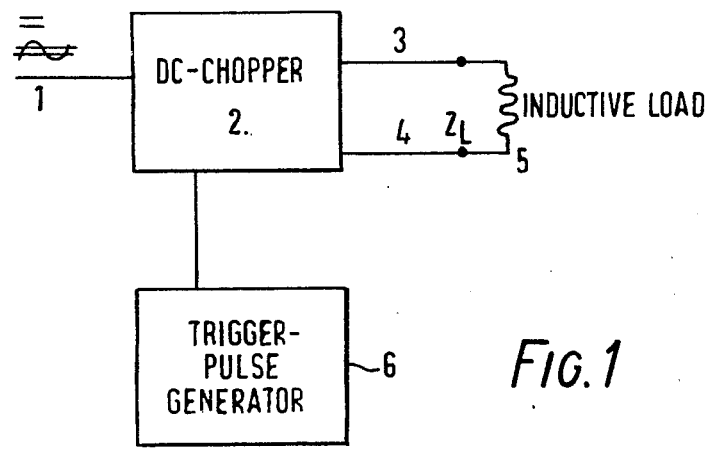

United States Patent [19]

Beierholm

[11] 4,032,834
[45] June 28, 1977

[54] METHOD FOR TRIGGERING A CONTROLLED RECTIFIER AND FOR KEEPING IT CONDUCTIVE AND A GENERATOR FOR THAT PURPOSE

[75] Inventor: Hans Mogens Beierholm, Augustenborg, Denmark

[73] Assignee: Danfoss A/S, Nordborg, Denmark

[22] Filed: Apr. 2, 1975

[21] Appl. No.: 564,269

Related U.S. Application Data

[63] Continuation of Ser. No. 403,341, Oct. 3, 1973, abandoned.

[30] Foreign Application Priority Data

Oct. 24, 1972   Denmark ........................... 5253/72

[52] U.S. Cl. ........................... 363/128; 307/252 R; 307/260; 328/156
[51] Int. Cl.² ......................................... H02M 7/48
[58] Field of Search ............... 307/252 R, 260, 264, 307/268; 328/156, 157, 158; 321/47

[56] References Cited

UNITED STATES PATENTS

| 3,646,578 | 2/1972 | Gregory | 328/157 |
| 3,681,677 | 8/1972 | Badal | 307/252 J |

Primary Examiner—William M. Shoop

[57] ABSTRACT

A method of triggering a controlled rectifier to ensure that it conducts fully and remains conducting for a required time, comprising supplying to the control electrode of the rectifier a large amplitude pulse with high transductance per unit of time to initiate conducting, and a small amplitude signal to maintain conducting. A circuit for producing such a pulse and signal comprises a pulse generator and a blocking oscillator both controlled by a control generator.

2 Claims, 5 Drawing Figures

METHOD FOR TRIGGERING A CONTROLLED RECTIFIER AND FOR KEEPING IT CONDUCTIVE AND A GENERATOR FOR THAT PURPOSE

This is a continuation of application Ser. No. 403,341 filed Oct. 3, 1973, now abandoned.

The invention relates to specification of a method for triggering a controlled rectifier and for keeping it conductive, and a generator for that purpose.

Controlled rectifiers are known already. However, use of them presents certain difficulties, a number of problems arising in case of inductive load. Because of the inductive load the current will normally be built up slowly, and if it is not built up fast enough the SCR may, if pulse excitation is used, have time to switch off before the current has been built up. A different method of control is use of a pulse train, which method has the advantage that it makes allowance for the inductive load. However, trouble will often arise because full conductivity is a must in case of high loads, so as to avoid the so-called "soft" or incomplete triggering all over the semi-conductor material of the SCR. This is particularly marked in case of certain applications such as inverters for control of for instance asynchronous motors. Here a number of controlled diodes are used, for instance in the inverter itself, and also in the D.C. inverter. Such an embodiment is specified in our applications Nos. 248/69 and 251/69. In such cases the controlled rectifiers can sometimes be put off and on in a different situation, namely when a large current is immediately to pass through the controlled rectifier triggered, and as mentioned above this causes problems because of the inductive load. A chopper or inverter can be controlled either through a regular frequency or through a so-called time-proportional control, which is specified in our application No. 2509/72. Here the frequency may vary and become comparatively low, and thereby cause even greater problems than the principle based on regular-frequency control.

The invention relates to specification of a method excluding "soft" triggering of a controlled rectifier, at the same time keeping the latter conductive. The problem of keeping the controlled rectifier conductive is known already, as it is possible to make circuits creating a holding current through the main conduction direction of the controlled rectifier. However, this causes power losses which may be considerable in case of the above applications as, because of the variable output voltage, we may risk to have to maintain this current at minimum voltage. This causes a power loss which may be of the same value as the output.

According to the invention this is avoided by inducing to the control electrode of the controlled rectifier a pulse of relatively high amplitude and of a high transcenductance per time unit, and by inducing to the same control electrode another signal, but of a lower amplitude, and by continuing the latter signal at least until a certain current is passing through the main circuit of the controlled rectifier. What is obtained is that through the first pulse it is possible to avoid the "soft" triggering of the controlled rectifier, and at the same time the second pulse will keep the SCR conductive, the necessary current passing throught the main circuit, independent of the holding current; less power will be arrested, and power loss is avoided.

According to the invention it is sufficient to induce to the controlled rectifier control pulses of a comparatively high amplitude and of a high transconductance per time unit, and then, while the controlled rectifier is conductive, to induce to the same control electrode another signal, but of a lower and preferably constant amplitude, and to maintain the latter signal at least until current is passing through the main circuit of the controlled rectifier. This ensures that, due to the above order of signals, there will be no mis-triggering because of the second signal being induced before the pulse signal. Unlike what was the case before, the signal can be of a constant amplitude, for instance be a D.C. signal. At the same time the time lag prevents the second signal from deforming the first one.

According to the invention it is a further advantage that the second signal is obtained through a series of pulses of preferably constant amplitude, sent over a period corresponding to the time desired for the controlled rectifier to be conductive, and then the rectifier is put off. What is obtained is that the pulses will arrest a minimum of energy in the SCR, and at the same time this is obtained throughout the time when the controlled rectifier is required to be on. Moreover, the rectifier is conductive at any time within the said period, and is effectively and fully conductive.

According to the invention it is a further advantage that the second signal is induced to the control electrode before the amplitude of the pulse has dropped to the amplitude of the second signal. Consequently, a "soft" triggering can never happen after the controlled rectifier has been made fully conductive. At the same time, a minimum of power is arrested in the controlled rectifier, so the power consumption will be low.

A generator for this purpose, according to the above, can consist of a controlled generator and a pulse unit, characterized by the pulse unit as well as a signal generator being connected to the output electrode of the control generator, and the output electrodes of the pulse unit and the signal generator being connected to a summing-up unit, the output electrode of which is connected to the control electrode of the controlled rectifier. This construction of the control in question is very simple and advantageous.

According to the invention the time lag desired can be obtained by insertion of a time-lag unit between the output electrode of the signal generator and the input electrode of the control generator. Thereby the desired time lag is obtained, preventing "soft" triggering. According to the invention the signal generator can be an oscillator, and it is a special advantage that it is a blocking oscillator. By means of the blocking oscillator a series of pulses can be obtained, forming a pulse train which is very easily controlled. According to the invention the pulse unit can be a chargeable capacitor unit which is discharged through a pulse transformer and which has devices for discharging the capacitor, and where such devices are controlled by the control generator. Thereby a pulse of the desired duration is obtained, and according to the invention it is a further advantage that the pulse transformer has a secondary winding, and that the oscillator has a secondary winding, and that the said secondary windings are connected in parallel. What is obtained thereby is that it is possible in this summing-up unit to make a galvanic separation, permitting triggering of controlled rectifiers which may have other potentials than those used for the control generator.

The invention is specified below in embodiments illustrated in the drawings, showing in FIG. 1 a block diagram of the pulse-controlled D.C. inverter with inductive load, FIG. 2 such a circuit in detail, FIG. 3 a block diagram of the control generator, FIG. 4 a pulse graph, and FIG. 5 a detailed circuit of the generator.

FIG. 1 shows, in principle, the build-up of for instance a D.C. inverter 2, fed by a D.C. or an A.C. voltage. The D.C. inverter has an output electrode 3, 4 which is impedance-loaded 5. The D.C. inverter 2 is controlled by a trigger-pulse generator 6.

Figure 2:
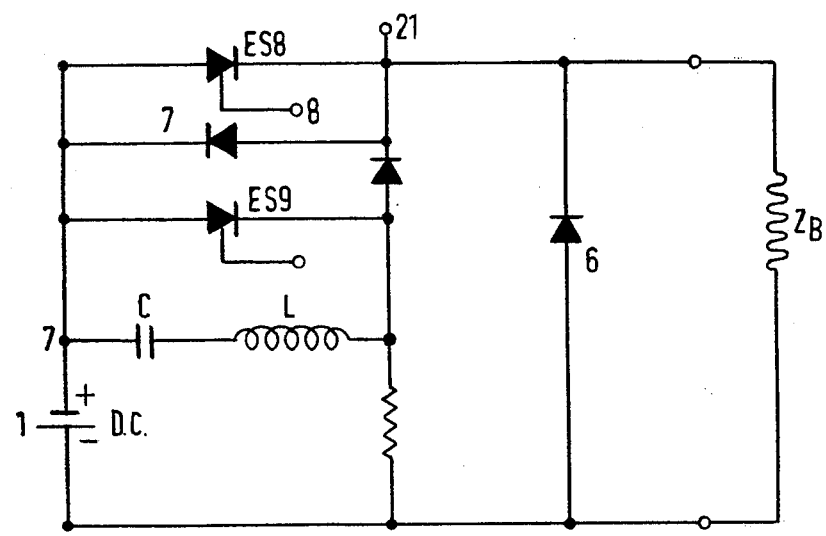
Figure 3:
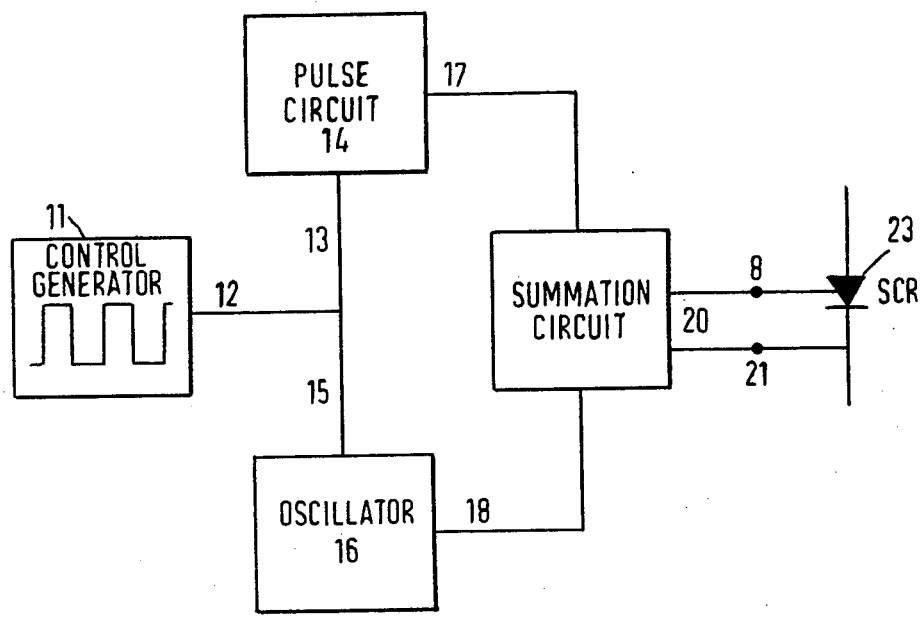

FIG. 2 shows, in detail, the circuit of the D.C. inverter 2. The power source 1 is a D.C. source, the upper terminal 7 of which is connected, via a controlled rectifier ES8, to the load 5. Parallel to the load 5 there is the diode 6 which maintains conduction when the controlled recitifer ES8 is open. The diode 7 is a protective diode which is parallel to ES8, and the circuit consists of the controlled rectifier ES9. The capacitor C and the induction L serve to close the controlled rectifier. The signal is induced to the control electrode 8 of the controlled rectifier ES8.

Figure 4:
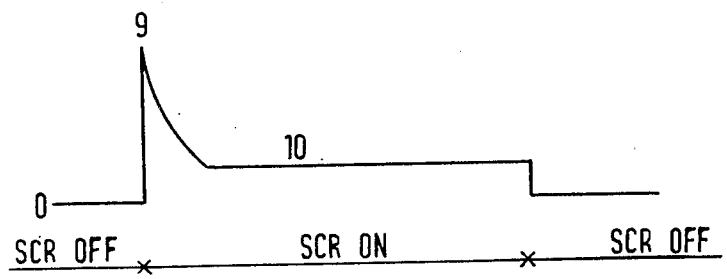
Figure 5:
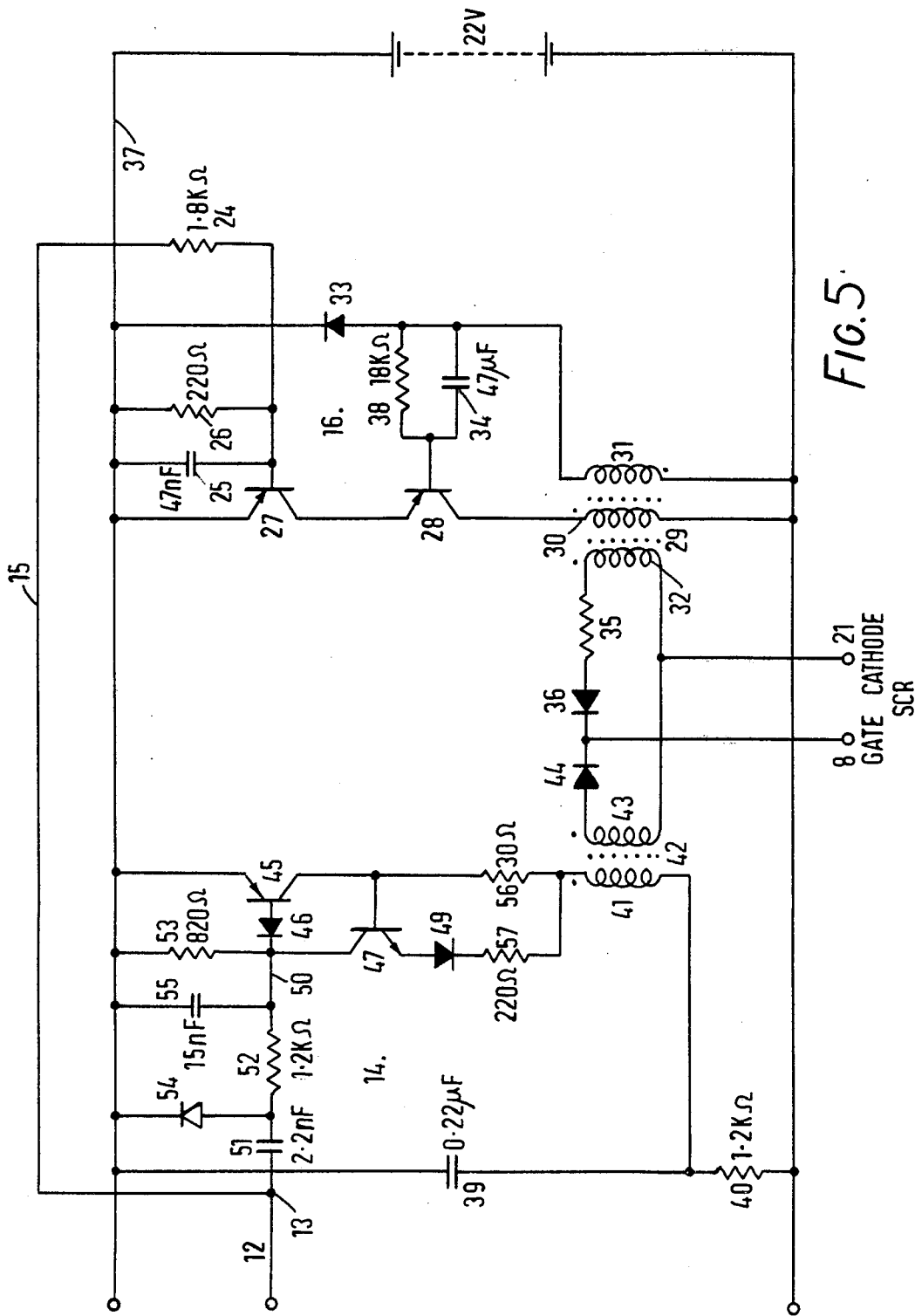

FIG. 4 shows the pulse, consisting of a high-transconductance pulse 9 and a signal 10 of constant amplitude. This signal can be either a continuous D.C. signal or, if galvanic separation is desirable, a series of high-frequency pulses. The control generator is shown in FIG. 3 and consists of a control generator 11 emitting square-wave pulses which are conducted, via its output electrode 12, to the input electrode 13 of the pulse circuit 14, and via the input electrode 15 to the oscillator 16. The output electrode 17 of the pulse circuit and the output electrode 18 of the oscillator are connected to a summing-up circuit 19, the output electrode 20 of which is connected to cathode 21 and control electrode 22 respectively. The detailed diagram is seen in FIG. 5. From the output electrode 12 of the control generator the signal passes via the wire 15 to the blocking oscillator 16. The resistor 24 and the capacitor 25 form a time-lag unit, providing the required time lag of for instance 2–10 $\mu$ sec. at a maximum trigger frequency of the D.C. inverter of abt. 1 kc/s. The resistor 26, which is parallel to the capacitor 25, serves to discharge the capacitor 25. The signal obtained controls the transistor 27 and thereby the blocking oscillator.

In principle, the blocking oscillator consists of the transistor 28, the transformer 29 with the primary winding 30, the tertiary winding 31 and the secondary winding 32. The diode 33 serves to recover the magnetic energy from the transformer 29 and provides the feedback required for the functioning as a blocking oscillator. The capacitor 34 provides a peak pulse to the base for both forward and reverse, and minimizes change-over losses and -time. Via the resistor 35 and the diode 36 the secondary winding 32 of the transformer 29 is connected to the output terminals 21 and 22. The transistors 27 and 28 are connected in series from the positive terminal 37, and the collector of the transistor 28 is connected to one end of the primary winding 30 of the transformer 29. The base of the transistor 27 is connected to the joint connection between the capacitor 25, the resistor 26 and the resistor 24. The base of the transistor 28 is connected to one end of the capacitor 34 and one end of the resistor 38, and the other ends of the resistor 38 and the capacitor 34 respectively are connected to the joint connection between the diode 33 and the tertiary winding 31. In principle, the blocking oscillator works like the blocking oscillators known so far and is specified in our patent application No. 6300/68.

From the output electrode 12 a signal passes via 13 to the pulse generator. The generator consists of a capacitor 39 which is charged from the battery voltage by means of the resistor 40. From the joint connection between the capacitor 39 and the resistor 40 a wire leads to one side of the primary winding 41 of the transformer 42, which has a secondary winding 43, connected via a diode 44 to the output electrode 21, 22. The transistor 45, the diode 46, the transistor 47 and the diode 49 form a well-known substitute for a controlled recitifer. The anode of this substitute SCR is connected to the other side of the primary winding 41, and its cathode is connected to the other side of the feed voltages via its connecting wire 37. Between the control electrode 50 of this controlled rectifier and the input electrode 13 there is a capacitor 51, the resistor 52 and the resistor 53, forming a differentiation unit, differentiating the square-wave pulses from the output electrode 12. The diode 54 serves to quench pulses of opposite polarity. The capacitor 55 is in a way a capacitor which is known already, connected via the control electrode of the SCR to the cathode. The operation is as follows:

Through the resistor 40 the capacitor 39 is charged to full potential and with an adequate time constant. If there is a square-wave pule it is differentiated in the network 51, 52, 53, and thereby the controlled rectifier, consisting of the transistor 45, 47, becomes conductive, and the capacitor is now discharged through the primary winding 41 of the pulse transformer and through SCR-controlled rectifiers, consisting of the transistor 45, 47. Thereby a high-transconductance current pulse of a high amplitude will arise in the secondary winding 43, and presently, with a certain time lag because of the resistor 24 and the capacitor 25, the blocking oscillator will become operative and be so as long as the signal is ON, i.e. during one of the half-periods of the square-wave signal from the input electrode 15. If the signal stops, or its polarity changes, the transistor 27 stops being conductive, and thereby the blocking oscillator is stopped. So, this circuit gives, with a certain time lag, at first a very strong current pulse of a relatively high amplitude, followed by a series of high-frequency pulses, for instance with a frequency of abt. 100 kc/s. What is obtained is that the first strong and high-transconductance current pulse will trigger the controlled rectifier to be conductive, and so that the triggering of the semi-conductor material will not be so-called "soft" or incomplete. After that it is sufficient that the pulse train from the generator 16, which is of a lower amplitude, can keep it fully conductive without a second and "soft" triggering.

The resistor 43 as a substitute for the controlled rectifier 45, 47 determines the holding current, passing mostly through the transistor 45. The function of the resistor 44 is to limit the current passing through the transistor 47, and thereby the base current of the transistor 45.

Together with the resistor 43 the diode 49 determines the holding current, and when the voltage drops abt. 1 volt in the resistor 43, there will be no holding current.

The diode 46 serves to determine amplitude and the trigger signal for the base of the transistor 45.

Besides, the resistors 43 and 35 serve to make the output electrodes of the two stages short-circuit-proof.

What we claim is:

1. A circuit for controlling the supply of current to an inductive load, the circuit comprising: a controlled rectifier, of the type having a control electrode and a main current path, said inductive load being connected in series with said main current path; control generator means having an output; pulse generator means and signal generator means each having an input connected to said output of said control generator means, and each having an output; said pulse generator means further comprising a capacitor, means for charging said capacitor, a pulse transformer and means controlled by said generator means for discharging said capacitor through said pulse transformer; summing means having an input connected to said outputs of said pulse generator means and said signal generator means, and an output connected to said controlled rectifier; said pulse generator means being operative to supply to said control electrode via said summing means a short duration pulse of relatively large amplitude with high transconductance per unit of time to cause said main current path to become conducting and current to start to flow in said inductive load; and said signal generator means being operative to supply to said control electrode via said summing means a train of discrete pulses of relatively small amplitude, said supply of pulses being maintained at least until a predetermined current is flowing in said main current path and in said inductive load; and said circuit further comprising delay means connected between said output of said control generator means and said input of said signal generator means to delay supply of said pulse train to said control electrode until the amplitude of said short duration pulse is falling towards the amplitude of the pulses forming said train.

2. A direct current inverter for supplying direct current to an inductive load, the inverter comprising a controlled rectifier, of the type having a control electrode and a main current path adapted to be connected in series with said load; and a generator circuit for triggering said controlled rectifier and comprising control generator means having an output; pulse generator means and signal generator means each having an input connected to said output of said control generator means, and each having an output; summing means having an input connected to said outputs of said pulse generator means and said signal generator means, and an output connected to said controlled rectifier; said pulse generator means being operative to supply to said control electrode via said summing means a short duration pulse of relatively large amplitude with high transconductance per unit time to cause said main current path to become conducting and current to start to flow in said inductive load; and said signal generator means being operative to supply to said control electrode via said summing means a train of pulses of relatively small amplitude, said supply of pulses being maintained at least until a predetermined current is flowing in said main current path and in said inductive load; and said circuit further comprising delay means connected between said output of said control generator means and said input of said signal generator means to delay supply of said pulse train to said control electrode until the amplitude of said short duration pulse is falling towards the amplitude of the pulses forming said train.

* * * * *